United States Patent
Jackson

[15] 3,694,437
[45] Sept. 26, 1972

[54] PROCESS FOR PREPARING CEPHALOSPORIN COMPOUNDS

[72] Inventor: Billy G. Jackson, Indianapolis, Ind.

[73] Assignee: Eli Lilly and Company, Indianapolis, Ind.

[22] Filed: Aug. 19, 1970

[21] Appl. No.: 65,238

Related U.S. Application Data

[63] Continuation-in-part of Ser. No. 754,992, Aug. 23, 1968, abandoned.

[52] U.S. Cl. ............................. 260/243 C, 424/246
[51] Int. Cl. ........................................... C07d 99/24
[58] Field of Search ................................. 260/243 C

[56] References Cited

UNITED STATES PATENTS 3,575,970  4/1971  Weissenburger et al. ..................... 260/243 C

FOREIGN PATENTS OR APPLICATIONS 1,073,530  6/1967  Great Britain ......... 260/243 C Primary Examiner—Nicholas S. Rizzo
Attorney—Everet F. Smith and John T. Reynolds

[57] ABSTRACT

New silylated cephalosporins from silylamide compounds and an improved process for preparing cephalosporin antibiotics, for example, cephaloglycin, cephalexin, and cephalothin where the acylation of a silylated cephalosporin nucleus is involved.

8 Claims, No Drawings

PROCESS FOR PREPARING CEPHALOSPORIN COMPOUNDS

CROSS REFERENCE

This application is a continuation-in-part of application Ser. No. 754,992, filed Aug. 23, 1968 now abandoned.

BACKGROUND OF THE INVENTION

1. Field of Invention and Objects of the Invention

This invention relates to cephalosporin compound technology. It is particularly concerned with providing certain improvements in the processes that are used in manufacturing cephalosporin antibiotic compounds where acylation of a cephalosporin nucleus is the route selected.

Cephalothin is now a well-known and widely used antibiotic. It is sold commercially in the form of the sodium salt. This antibiotic is generally made by acylation of the so-called cephalosporanic acid nucleus, 7-aminocephalosporanic acid, commonly abbreviated 7-ACA, with thiophene-2-acetic acid or an activated acylating form of that acid. Cephaloridine, another potent cephalosporin antibiotic, is generally prepared by reacting pyridine with cephalothin, although it also can be prepared by acylating the cephalosporin $C_A$ (pyridine) nucleus, 7-amino-3-(N-pyridinino-methyl)-$\Delta^3$-cephem-4-carboxylic acid with thiophene-2-acetic acid or an activated form thereof as indicated above. The relatively new orally active cephalosporin antibiotics such as cephaloglycin and cephalexin are formed by acylating the cephalosporin nucleu 7-ACA and 7-aminodesacetoxycephalosporanic acid (7-ADCA), respectively, with a mixed anhydride of an N-protected form of phenylglycine.

An object of this invention is to provide certain new process steps which possess advantages over the presently used methods for making cephalosporin antibiotics, when acylation of a cephalosporin nucleus is involved in the process. Another object is to provide certain new silylated cephalosporins which are useful as intermediates in the production of cephalosporin antibiotics.

2. Description of the Prior Art

In British Pat. No. 1,073,530 there is disclosed the use of certain silyl chlorides or amines in the process of making certain cephalosporins. However, that patent in no way discloses any specific cephalosporins or the use of the herein described silylated amide compounds. Furthermore, the silyl amide method of this invention offers several advantages over the method of the British patent. By the method of this invention, the silylation of the cephalosporin nucleus such as 7-ACA or 7-ADCA may be performed at room temperature or below, thus avoiding thermal degradation of the cephalosporin nucleus. Also, excess silylating agent does not have to be removed from the silylated cephalosporin nucleus prior to the acylation step, whereas this removal step is a prerequisite where silyl amine or silazanes are used as silylating agents. By the use of this invention no base is liberated or employed in the silylation reaction, thus avoiding the possible isomerization of the delta-3-double bond in the cephalosporin nucleus end product. Also, by this process it is not necessary to provide for the elimination of by-product hydrogen chloride generated when silyl chlorides are used, following the above British patent procedure.

SUMMARY OF THE INVENTION

Briefly, this invention provides a process which involves reacting the selected cephalosporin nucleus with a mono- or bis-silylamide, which may be a simple linear or cyclic anide, a urea, or a urethane (carbamate) in a substantially anhydrous aprotic liquid solvent at a temperature of from about $-50°$ C. to about $50°$ C. to form the mono- or di-silylated cephalosporin compounds, some of which are new and which can be directly acylated with acylating groups known to provide the resulting cephalosporin with antibiotic activity.

DETAILED DESCRIPTION OF THE INVENTION

One aspect of this invention provides a process which comprises reacting a cephalosporin nucleus compound of the formula

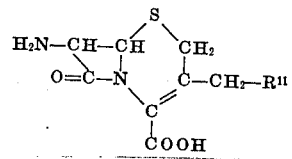

where $R^{11}$ is hydrogen, $C_1$ to $C_8$-alkanoyloxy, or a $C_1$ to $C_6$-alkyl-X— where X is oxygen or sulfur, as the free acid, zwitterion or as a soluble salt, with a silicon compound having a formula selected from the group consisting of I. 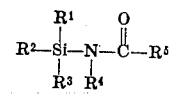

II. 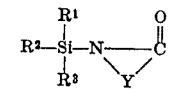

III. 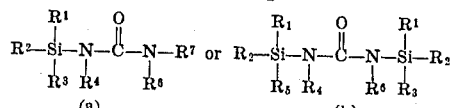

IV. 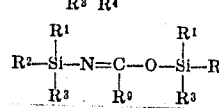

V. 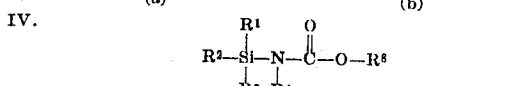

wherein each of $R_1$, $R_2$, and $R_3$ is selected from the group consisting of hydrogen and hydrocarbon radicals free of aliphatic unsaturation and having from one to eight carbon atoms with not more than two of any $R^1$, $R^2$, and $R^3$ bonded to the same silicon atom being hydrogen;

$R^5$ is hydrogen or a hydrocarbon radical which is free of aliphatic unsaturation and contains from one to eight carbon atoms;

Y is an alkylene group having from three to 18 carbon atoms with a chain of at least three but no more than five carbon atoms extending between the nitrogen and the carbonyl group to which Y is bonded;

Each of $R^4$, $R^6$ and $R^7$, taken separately, is hydrogen or a hydrocarbon group free of aliphatic unsaturation containing from one to eight carbon atoms, and $R^6$ and $R^7$ taken together with the nitrogen to which they are bonded, complete a heterocyclic ring containing from five to six ring forming atoms, one of which can be oxygen para to the nitrogen, and from four to five ring forming carbon atoms with the proviso that $R^6$ and $R^7$ together contain not more than 18 carbon atoms and that if $R^6$ is an alkyl with a tertiary carbon bonded to the nitrogen then $R^7$ is hydrogen;

$R^4$ and $R^8$ taken together with the nitrogens to which they are bonded and the carbonyl group complete a heterocyclic ring containing from five to six ring forming atoms and from two to three methylene ring forming carbon atoms;

$R^8$ is a hydrocarbon group free of aliphatic unsaturation and containing from one to eight carbon atoms; and $R^9$ is either hydrogen or a hydrocarbon group free of aliphatic unsaturation and containing from one to eight carbon atoms, in a substantially anhydrous, aprotic liquid solvent, at a temperature of from about $-50°$ C. to about $50°$ C. to form a compound of the formula

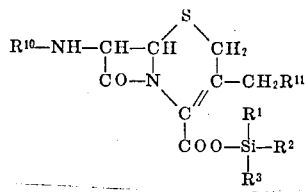

wherein $R^1$, $R^2$, and $R^3$ are as defined above and $R^{10}$ is hydrogen or the group

wherein $R_1$, $R_2$, and $R_3$ are as defined above, and $R_{11}$ is hydrogen, $C_1$ to $C_8$-alkanoyloxy, or a $C_1$ to $C_6$-alkyloxy where X is oxygen or sulfur.

These silylated cephalosporin products can be used in processes for preparing a variety of known cephalosporin anti-biotics, such as cephalothin, cephaloridine, cephaloglycin, cephalexin, 3-methylthiomethyl-7-[D-2'-amino-2'-phenylacetamido]-3-cephem-4-carboxylic acid, and the like. Acylation of the above silylated product where $R^{11}$ is acetoxy with a N-protected activated form of phenylglycine, by known acylation procedures followed by treatment with methanol, and pH adjustment to the isoelectric point yields cephaloglycin.

This invention also provides new silylated cephalosporin intermediates of the above formula where $R^{11}$ is hydrogen, or $-X-CH_3$ where X is oxygen or sulfur. Such compounds are readily prepared by treating 7-ADCA or an internal or external soluble salt thereof with one of the silylating agents I to V set forth above. These compounds are useful as intermediates in the production of cephalosporin antibiotics such as cephalexin (where $R^{11}$ is hydrogen) in which process these new compounds can be directly acylated with a $C_1$ to $C_4$-lower alkyl mixed anhydride or an activated ester of an N-protected form of phenylglycine, treated with alcohol, to remove the silyl groups, treated with acid to lower the pH to remove the N-protecting group and adjusted in pH to one of the isoelectric points of cephalexin to precipitate cephalexin from the solution.

Specific examples of these new compounds include:
Trimethylsilyl 7-(N-trihexylsilylamino)-3-methyl-$\Delta^3$-cephem-4-carboxylate,
Trihexylsilyl-7-(N-trihexylsilylamino)-3-methyl-$\Delta^3$-cephem-4-carboxylate, Trimethylsilyl 7-(N-trimethylsilylamino)-3-methoxymethyl-$\Delta^3$-cephem-4-carboxylate,
Trimethylsilyl 7-(N-trimethylsilylamino)-3-methylthiomethyl-$\Delta^3$-cephem-4-carboxylate,
Tricyclohexylsilyl 7-(N-tricyclohexylsilylamino)-3-methyl-$\Delta^3$-cephem-4-carboxylate,
Triphenylsilyl 7-(N-triphenylsilylamino)-3-methyl-$\Delta^3$-cephem-4-carboxylate.

The 7-amino group of the silylated cephalosporin nucleus intermediates can be reacted with an acylating agent by procedures known to date, for example as described in U.S. Pat. No. 3,382,241. Preferred acylating agents are those which are known to contribute to the making of a cephalosporin compound having optimum antibiotic activity while having other desired properties as well. Such other properties include good water solubility, ease of purification, good absorbability when administered by the oral route, or low degree of pain upon injection and the like, depending upon the intended mode of administration. Examples of such acylating agents are 2-(2'-thienyl)acetyl halides such as the chloride or bromide, and mixed anhydride or activated ester forms of 2-(2'-thienyl)acetic acid or of an N-protected phenyl-glycine such as the methyl N-(tert-butoxycarbonyloxy)-phenyl-glycine mixed carbonic anhydride, isobutyl N-(benzyloxycarbonyloxy)-phenylglycine mixed carbonic anhydride, ethyl N-(2,2,2-trichloroethoxycarbonyloxy)-phenylglycine mixed carbonic anhydride and cyanomethyl N-(tert-butoxycarbonyloxy)phenylglycinate ester and the like.

In preparing cephalosporin compounds using this invention (a) the cephalosporin nucleus compound is reacted with a silyl compound having a formula of the type represented by formulas I, II, III, IV, and V above in a substantially anhydrous aprotic solvent at a temperature of from about $-50°$ C. to about $50°$ C. to form a silylated cephalosporin nucleus ester intermediate, (b) the silylated nucleus intermediate product from step (a) is reacted with the desired acylating agent to form the acylated cephalosporin intermediates, (c) the acylated cephalosporin intermediate is treated with an alcohol, preferably a $C_1$ to $C_6$ alkanol to obtain the cephalosporin in solution, freed from the silyl groups, and (d) the cephalosporin is recovered from the solution by known methods. For example, when the nucleus compound which is silylated in step (a) is 7-ACA, the silylated 7-ACA can be acylated with 2-(2' thienyl)acetyl chloride to form cephalothin. Cephalothin, a known commercial antibiotic (U.S. Pat. No. 3,218,318) can be recovered as the alkali metal salt, e.g., the sodium or potassium salt by the addition of sodium or potassium acetate. When 7-ADCA is used as the nucleus compound, 7[D-2'amino-2-phenylacetamido]-3-methyl-3-cephem-4-carboxylic acid, now known generically as cephalexin [U.S. Pat. No. 3,507,861] can be prepared.

Other cephalosporin nucleus compounds which can be used in the process of this invention to make cephalosporin antibiotics include 7-amino-3-methylthiomethyl-3-cephem-4-carboxylic acid, disclosed in Belgian Pat. No. 734,532, published Dec. 16, 1969, and 7-amino-3-methoxymethyl-3-cephem-4-carboxylic acid, disclosed in Belgian Pat. No. 719,710, published Feb. 20, 1969. The cephalosporin antibiotics 7-[D-2aw:amino-2'-phenylacetamido]-3-methylthiomethyl-3-cephem-4-carboxylic acid and 7-[D-2'-amino- 2'-phenylacetamido]-3-methoxymethyl- 3-cephem-4-carboxylic acid can be prepared from the above respective nucleus compounds. When cephaloglycin or cephalexin or similar amino group containing cephalosporin antibiotics are being prepared, the N-protecting group must be removed from the amino-acid moiety of the cephalosporin. For this purpose water, acid, or mixtures thereof are added to the cephalosporin containing mixture simultaneously with or soon after the alcohol addition. The resulting amino-group containing cephalosporin product can be separated from the reaction mixture by adjusting the pH of the mixture to the isoelectric point of the cephalosporin at which pH the cephalosporin separates from the mixture from which it can be recovered by conventional chemical methods.

The organic silicon compounds of the class represented by the formulas I and II are defined in detail in U.S. Pat. No. 2,876,234 issued Mar. 3, 1959. These are monosilylated amides but include both the acyclic and cyclic types. The silylated urea amide compounds (III) and the silylated urethane or carbamate compounds (IV) can be prepared as described in U.S. Pat. No. 2,876,209. Bis-silyl compounds of formula V are well-known compounds and have been described in publications such as the one found in the *Journal of the American Chemical Society*, Volume 88, page 3,390.

Examples of the intermediate compounds which can be produced in the process of this invention and the reactants from which they can be prepared include:
Triethylsilyl 3-methyl-7-(N-triethylsilylamino)-$\Delta^3$-cephem-4-carboxylate from 7-ADCA and N,O-bis(triethylsilyl)acetamide;
Trihexylsilyl 3-acetoxymethyl-7-(N-trihexylsilylamino)-$\Delta^3$-cephem-4-carboxylate from 7-ACA and 1-(trihexylsilyl)-2-piperidinone;
Triphenylsilyl 3-methyl-7-(N-triphenylsilylamino)-$\Delta^3$-cephem-4-carboxylate from 7-ADCA and 1-(triphenylsilyl)-2-pyrrolidinone;
Tribenzylsilyl 3-acetoxymethyl-7-(N-tribenzylsilylamino)-$\Delta^3$-cephem-4-carboxylate from 7-ACA and N-tribenzylsilyl methyl carbamate;
Dimethyl(phenyl)silyl 3-methyl-7-(N-dimethylphenylsilylamino)-$\Delta^3$-cephem-4-carboxylate from 7-ADCA and dimethyl(phenyl)silylurea, and the like.

Specific starting materials, intermediates, and products of the process of this invention are named, for convenience, by use of the "cephem" nomenclature system which has been adapted to cephalosporin compounds from an analogous nomenclature system, based on "penam" for naming specific penicillin compounds. "Penam" nomenclature for the penicillins is described by Sheehan, Henery-Logan, and Johnson in the Journal of American Chemical Society (JACS), 75, 3292, footnote 2, (1953), and has been adapted to the cephalosporins by Morin et al in JACS, 84, 3,400 (1962). In accordance with these systems of nomenclature, "penam" and "cepham" refer respectively to the following saturated ring systems

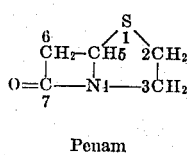

Penam

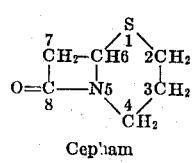

Cepham

"Cephem" refers to the cepham ring structure containing a double bond, the position of which is indicated by the prefix "$\Delta$" with an integer superscript denoting the lowest numbered carbon atom to which the double bond is connected, or by the word "delta" with the same number relationship. Occasionally, a number immediately preceeding the word "cephem" is used by itself to indicate the position of the double bond in the "cephem" structure. Thus, 7-aminocephalosporanic acid (7-ACA) can be named 7-amino-3-acetoxymethyl-$\Delta^3$-cephem-4-carboxylic acid, while a corresponding silylated product of the process of this invention can be named triethylsilyl 7-(N-triethylsilyl)amino-3-acetoxymethyl-$\Delta^3$-cephem-4-carboxylate. Similarly, by this system 7-ADCA can be named 7-amino-3-methyl-$\Delta^3$-cephem-4-carboxylic acid.

EXAMPLE 1

A 10.0 g portion of 7-aminocephalosporanic acid, and 17.6 ml of N-, O-bis-trimethylsilylacetamide, and 100 ml of dry acetonitrile were mixed and stirred at room temperature until trimethylsilyl 7-(N-trimethylsilylamino)-3-acetoxymethyl-$\Delta^3$-cephem-4-carboxylate was formed. In a separate operation 10.0 g of the N-methyl acetoacetate-blocked phenylglycine, 100 ml of dry acetonitrile, and 0.04 ml of dimethylbenzylamine were mixed and cooled to $-10°$ C. while stirring and to this mixture there was added 3.1 ml of methyl chloroformate (8 percent excess) in one portion, to form a mixed anhydride of the N-protected phenylglycine. The reaction temperature of this second mixture rose to approximately $-3°$ C. Stirring and cooling of the mixture was continued for an additional 3 to 5 minutes during which time the temperature dropped to $-10°$ C. To this a resulting mixed anhydride solution was added the above trimethylsilyl 7-(N-trimethylsilylamino)-3acetoxymethyl-$\Delta^3$-cephem-4-carboxylate solution which had been previously chilled to about $-10°$ C. at a rate as to maintain the temperature at $-10°$ C to about $-5°$ C. Addition generally required from about 4 to 8 minutes. Following the addition, the reaction mixture was stirred, and the cooling vessel was allowed to warm up. After one and one-half hours the temperature was about 3° C. All of the above operations were conducted with precautions taken to exclude atmospheric moisture. In this example a drying tube containing DRIERITE drying agent was used.

The acylation reaction mixture was then chilled to 0° C. and 50 ml of methanol was added. Stirring was continued for 10 minutes after which time the mixture was filtered with the aid of a filter aid (HYFLO-SUPERCEL). The volume of the filtrate and the methanol washes which followed was adjusted to 350 ml and then 50 ml of deionized water was added. Cephaloglycin as the zwitterion separated after a few minutes stirring at 0° C. Stirring at 0° C was continued for 2 to 3 hours to insure precipitation of most of the cephaloglycin and then the product was filtered, rinsed with acetonitrile, and vacuum dried at about 40° C. Yield of dry cephaloglycin was 11 to 12 grams (82 to 88 percent of theory).

EXAMPLE 2

In an environment protected from atmospheric moisture trimethylsilyl 7-(N-trimethylsilylamino)-3- acetoxymethyl-Δ³-cephem-4-carboxylate was first prepared by combining 10.0 grams of 7ACA in 100 ml of dry acetonitrile with 20 g (86 millimoles) of N-trimethylsilylacetamide which mixture was stirred at room temperature for 60 minutes to insure solution. The trimethyl-silyl 7-(N-trimethylsilylamino)-3-acetoxymethyl-Δ³-cephem-4-carboxylate solution was cooled to 5° C. and then 5.7 ml of dry triethylamine was added in one portion. Then while stirring the mixture and continuing the cooling, a solution of 7.45 g of 2-(2'-thienyl)acetyl chloride (40.5 millimoles) in 20 ml of dry acetonitrile was added. The rate of addition was slow enough to keep the temperature below 5° C. The addition required about 25 minutes. When the addition was completed, the mixture was stirred at about 0° C. for one-half hour to insure complete reaction. The acylation reaction mixture was allowed to warm to 35° to 40° C. for about 20 minutes and then the solution was stripped of solvent, and the residue was taken up in methanol and the insoluble material was filtered off. The resulting methanol solution of the crude cephalothin product was stripped and the residue was taken up in water and ethyl acetate mixture. The pH of the mixture was adjusted to about 6.6 with 1 N sodium hydroxide. The aqueous phase of the resulting mixture was separated and the organic phase was discarded. The aqueous phase was layered with fresh ethyl acetate and the pH was adjusted to 2.0 with concentrated hydrochloric acid. After additional washes with ethyl acetate to insure collection of most of the cephalothin product in the organic phase, the ethyl acetate phases were dried over magnesium sulfate and stripped to obtain about 13 g. of cephalothin as product of the process.

EXAMPLE 3

In an environment protected from atmospheric moisture, a mixture of 7.2 g (33.8 millimoles) of 7-aminodesacetoxycephalo-sporanic acid, (7-ADCA) 17.6 ml (73.8 millimoles) of N,O-bis(trimethylsilyl)acetamide, and 100 ml of dry acetonitrile was stirred at room temperature for 2 hours. The resulting trimethylsily-lated 7-ADCA was added to the mixed anhydride

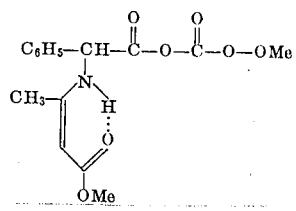

resulting from 10 g of methyl 3-(alpha-carboxybenzylamino)crotonate, sodium salt, 3.1 ml of methyl chloroformate, in 100 ml acetonitrile, containing 0.04 ml of N,N-dimethyl-N-benzylamine, cooled to −10° C. The resulting mixture was stirred for 65 minutes and then 50 ml. of methanol was added, and the mixture was stirred for an additional 10 minutes at about −3° C. The mixture was filtered through a filter aid (HYFLO) and rinsed with acetonitrile. The filtrate and the washes were combined and chilled to 0° C. and then 50 ml of water was added. Concentrated hydrochloric acid was added until the pH of the filtrate and washes was 2.0. Triethylamine was added to raise the pH to pH 4.2. The cephalexin which precipitated was filtered, rinsed with acetonitrile, and vacuum dried at about 40° C. There was obtained 10.0 g. of cephalexin.

Alcohols other than methanol such as benzyl alcohol and other lower alkanols having from two to six carbons, e.g., ethanol, n-propanol, isopropanol, n-butanol, isobutanol, tertbutanol mixed amyl alcohols, hexanol can also be used, but methanol or ethanol is preferred.

EXAMPLE 4

Following the procedure of Example 1, 7-ADCA is reacted with two molar equivalents of N-(triphenylsilyl)ethylcarbamate to form a triphenylsilyl 7-(triphenylsilylamino)-3-methyl-Δ³-cephem-4-carboxylate intermediate. This intermediate is reacted with an N-methyl acetoacetate)-protected α-amino-2-(2-thienyl) acetyl chloride and the resulting acylated product is treated with methanol and then with aqueous base to form 3-methyl-7-[(α-amino(2-thienyl)acetamido]-Δ³-cephem-4-carboxylate acid as the zwitterion, a known antibiotic.

EXAMPLE 5

Following the procedure of Example 3, 7-ADCA is treated with N-(triethylsilyl)urea to form a triethylsilylated 7-ADCA ester. This ester is treated with a mixed anhydride resulting from N-(benzyloxycarbonyl)phenylglycine and methyl chloroformate. The resulting acylated product is treated with methanol and then with aqueous acid to pH 2.0 to remove the protecting groups. Addition of base to the isoelectric point (about pH 4.2) causes cephalexin to precipitate from the reaction mixture.

EXAMPLE 6

Following the procedure of Example 1, 7-ACA is reacted with an excess molar proportion of the lactam resulting from trimethylsilyl chloride and 2-pyrrolidone to form trimethylsilyl 7-(trimethylsilylamino)-3-acetoxymethyl-Δ³-cephem-4-carboxylate ester. This ester is treated with (2-thienyl)acetyl chloride, and then treated with methanol to form cephalothin, which is removed from the reaction mixture by treatment with sodium acetate to form sodium cephalothin.

EXAMPLE 7

To a slurry of 3.6 g (16.9 mmoles) of 7-ADCA in 30 ml of dry acetonitrile was added 8.8 ml (33.5 mmoles) of N,O-bis(trimethylsilyl)acetamide (BSA). Upon mixing a slight exotherm was observed and after stirring at room temperature for a period of one-half hour, all of the 7-ADCA had dissolved. Analysis of the resulting solution by nuclear magnetic resonance (NMR) spectroscopy indicated that the product was trimethylsilyl 7-(trimethyl-silyl)amino-Δ³-cephem-4-carboxylate in acetonitrile solution. When less BSA was employed under the same conditions, NMR analysis indicated that the reaction product was a mixture of the above bis-silylated cephalosporin together with trimethylsilyl 7-amino-Δ³-cephem-4-carboxylate.

Similar results are obtained using N-trimethylsilyl-acetamide as silylating agent.

EXAMPLE 8

5.0 g. of 7-ACA, 8.8 ml (33.5 millimoles) BSA and 50 ml dry acetonitrile were mixed and stirred at room temperature for a period of two hours during which time the 7-ACA dissolved. NMR analysis of the resulting solution indicated that the product was trimethylsilyl 7-trimethylsilylamino-3-cephem-(ceph-3-em)-4-carboxylate mixed with excess BSA.

In another experiment run similarly except that 6.0 ml BSA were employed, NMR analysis indicated that bis-silylation was not complete and the product contained both the above bis-silylated ester and trimethylsilyl-7-amino-$\Delta^3$-cephem-4-carboxylate.

This invention also provides compositions comprising (a) the silylated cephalosporin nucleus compounds as described herein, (b) at least one of the mono- or bis-silylamide compounds of formulas I, II, III, IV, and V described above, and (c) an anhydrous solvent for components (a) and (b) which solvent molecules do not contain Zerewitinoff hydrogen. Component (b) can be any of the disclosed silylamides. The excess mono- or bis-silylamide reactant used in the formation of the silylated cephalosporin nucleus compound (a) can be used to satisfy component (b). Such excess silylamide serves to take up any water or alcohol introduced into the composition by atmospheric conditions or chemical reactions. Examples of solvents (c) which are free of Zerewitinoff hydrogen include nitriles, esters, ethers, halogenated alkanes and hydrocarbons, among others. Specific examples include the alkanonitriles having from two to six carbon atoms such as acetonitrile, hexanonitrile, the alkyl alkanoate esters having from four to 10 carbon atoms such as ethyl acetate, propyl acetate, amyl acetate, propyl hexanoate, cyclic and linear ether solvents such as tetrahydrofuran, dioxane, ethyl ether, diphenyl ether, and the like, halogenated alkanes including methylene chloride, chloroform, carbon tetrachloride, and hydrocarbon solvents such as hexane, heptane, benzene, toluene, and xylene, as well as alkanones such as acetone, methyl ethyl ketone, and mixtures of such solvents. These compositions are useful as such for reacting with the appropriate acylating agent to form cephalosporin antibiotics. For example, these compositions can be reacted with a mixed anhydride of an N-protected phenylglycine as described above to form cephaloglycin (from the silylated 7-ACA compositions) and cephalexin (from the silylated 7-ADCA compositions), respectively, which cephalosporins are known antibiotics.

EXAMPLE 9

A mixture of 10.0 g. of the cephalosporin nucleus compound, 7-aminocephalosporanic acid (7-ACA), 20.0 g of N-trimethylsilylacetamide (MSA) and 50 ml. of acetonitrile was stirred for a period of 45 minutes. Protection from atmospheric moisture was provided for this composition. Separately, a suspension of 11.0 g. of methyl 3-($\alpha$-carboxybenzylamino)crotonate, sodium salt and 50 ml of acetonitrile was chilled to −15° C and kept in a range of from −10° to −40° C. Then 3.4 ml. of methyl chloroformate was added followed by 0.03 ml. of N,N-dimethyl-benzylamine. Following the amine addition the reaction mixture was stirred for 5 minutes at −10° C. or below. When temperatures of about −40° C. are used stirring for about 20 minutes is recommended. To the mixed anhydride solution was then added the solution of silylated 7-ACA composition (precooled to −10° C. or less) over a period of 5 minutes.

The mixture was then allowed to react for a period of 1 hour allowing the temperature to rise to 5° C. Stirring continued for an additional 0.5 hour at 0° to 5° C. Then 25 ml of methanol was added and the pH of the mixture was adjusted to 1.5 with concentrated hydrochloric acid. Then 0.5 g of "Darco" brand decolorizing carbon was added and the mixture was filtered through a filter aid ("Hyflo"). The filtrate was then adjusted to pH 4.5 using triethylamine. The 7-[D-2'-amino-2'-phenylacetamido]-cephalosporanic acid product [cephaloglycin] crystallized from the mixture. It was stirred at 0° to 5° C. for 2 hours. Then the product was filtered off, washed with methanol, and acetonitrile and vacuum dried at 40° C. The usual yield by this procedure is 11 to 12.5 g of product.

EXAMPLE 10

Following the procedure of Example 9, 7-amino-3-methoxymethyl-3-cephem-4-carboxylic acid is silylated with MSA in acetonitrile to form the silylated 7-amino-3-methoxymethyl-3-cephem-4-carboxylic acid ester intermediate composition. This composition is treated as described in Example 9 to form as product 7-[D-2'-amino-2'-phenylacetamido]-3-methoxymethyl-3-cephem-4-carboxylic acid.

EXAMPLE 11

Following the procedure of Example 9, 7-amino-3-methylthiomethyl-3-cephem-4-carboxylic acid is silylated with MSA in acetonitrile to form the silylated 7-amino-3-methylthio-methyl-3-cephem-4-carboxylic acid ester intermediate composition. This composition is treated as in Example 9 to form as product 7-[D-2'-amino-2'-phenylacetamido]-3-methylthiomethyl-3-cephem-4-carboxylic acid.

EXAMPLE 12

Following the procedure of example 9, the cephalosporin nucleus compound, 7-amino-3-methylthiomethyl-3-cephem-4-carboxylic acid is silylated with MSA in acetonitrile to form the silylated 7-amino-3-methylthiomethyl-3-cephem-4-carboxylic acid ester intermediate composition. This composition is treated with D-2-tert-butoxycarboxamido-2-(3'-hydroxyphenyl)acetic acid in place of the mixed anhydride to form as acylated product the 7-[D-2'-tert-butoxycarboxamido)-2'-phenylacetamido]-3-methylthiomethyl-3-cephem-4-carboxylic acid. After methanol addition and acid treatment there is obtained as product 7-[D-2'-amino-2'-(3''-hydroxyphenyl)acetamido]-3-cephem-4-carboxylic acid, an antibiotic effective against a variety of Gram positive and Gram negative microorganisms. For example, this compound had a minimum inhibitory concentration (MIC) value of 0.31/ml in an agar gradient plate test against the organism, *Diplococcus pneumoniae*, compared to an MIC value of 2.5 μg/ml for cephalexin in the same test.

I claim:

1. In a process for preparing a cephalosporin compound by acylating a cephalosporin nucleus compound with an acylating form of 2-(2'-thienyl)acetic acid, or phenylglycine, the improvement which comprises (a) reacting the cephalosporin nucleus compound of the formula

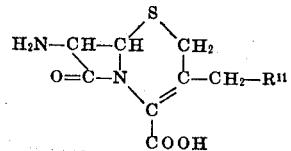

where $R^{11}$ is hydrogen, $C_1$ to $C_8$-alkanoyloxy, or a $C_1$ to $C_6$-alkyl —X—$CH_3$ where X is oxygen or sulfur, with a compound having a formula selected from the group consisting of I. 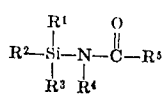

II. 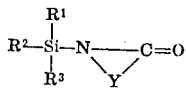

III. 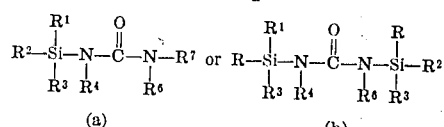

(a)     (b)

IV. 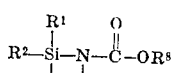

V. 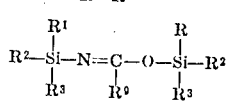

wherein each of $R^1$, $R^2$, and $R^3$ is selected from the group consisting of hydrogen and hydrocarbon radicals free of aliphatic unsaturation and having from one to eight carbon atoms with not more than two or any $R^1$, $R^2$, and $R^3$ bonded to the same silicon atom being hydrogen;

$R^5$ is hydrogen or a hydrocarbon radical which is free of aliphatic unsaturation and contains from one to eight carbon atoms;

Y is an alkylene group having from three to 18 carbon atoms with a chain of at least three but no more than five carbon atoms extending between the nitrogen and the carbonyl group to which Y is bonded;

Each of $R^4$, $R^6$, and $R^7$, taken separately, is hydrogen or a hydrocarbon group free of aliphatic unsaturation containing from one to eight carbon atoms, and $R^6$ and $R^7$ taken together with the nitrogen to which they are bonded, complete a heterocyclic ring containing from five to six ring forming atoms, one of which can be oxygen para to the nitrogen, anf from four to six ring forming carbon atoms with the proviso that $R^6$ and $R^7$ together contain not more than 18 carbon atoms and that if $R^6$ is an alkyl with a tertiary carbon bonded to the nitrogen then $R^7$ is hydrogen;

$R^4$ and $R^6$ taken together with the nitrogen to which they are bonded and the carbonyl group complete a heterocyclic ring containing from five to six ring forming atoms and from two to three methylene ring forming carbon atoms;

$R^8$ is a hydrocarbon group free of aliphatic unsaturation and containing from one to eight carbon atoms; and $R^9$ is either hydrogen or a hydrocarbon group free of aliphatic unsaturation and containing from one to eight carbon atoms, in a substantially anhydrous, aprotic liquid solvent, at a temperature of from about −50° C to about 50° C.

b. reacting the product from step (a) with a thiophene-2-acetic acid, a thiophene-2-2acetyl halide, a lower alkyl mixed anhydride of thiophene-2-acetic acid, or a mixed anhydride of an N-protected phenylglycine, c. treating the acylated product from step (b) with a $C_1$ to $C_6$ alkanol to form the cephalosporin and d. recovering the cephalosporin from the reaction mixture of step (c).

2. A process as defined in claim 1 wherein in step (a) the cephalosporin nucleus compound, 7-ADCA, is reacted with a compound of formula I wherein each of $R^1$, $R^2$, and $R^3$ is a hydrocarbon radical which is free of aliphatic unsaturation and having from one to eight carbon atoms; $R^4$ is hydrogen, and $R^5$ is a hydrocarbon radical which is free of aliphatic unsaturation and has from one to eight carbon atoms, in step (b) the step (a) reaction product is acylated with an activated N-protected phenylglycine, and in step (c) the acylated product from step (b) is treated with methanol to form cephalexin.

3. A process as defined in claim 2 wherein in step (a) 7-ACA is used in place of 7-ADCA so that at the completion of steps (a), (b), and (c) cephaloglycin is formed.

4. A process as defined in claim 1 wherein the reaction product of step (a) is treated in step (a) with 2-(2'-thienyl)-acetyl chloride, and the acylated product from step (b) is treated in step (c) with methanol to form cephalothin.

5. A process which comprises reacting 7-aminocephalosporanic acid with N-trimethylsilylacetamide in a substantially anhydrous aprotic solvent containing acetonitrile, b. reacting the product from step (a) with a $C_1$ to $C_4$-alkyl mixed anhydride form of an N-protected phenylglycine, c. treating the product from step (b) with methanol, and d. recovering cephaloglycin from the reaction mixture (c).

6. A compound of the formula

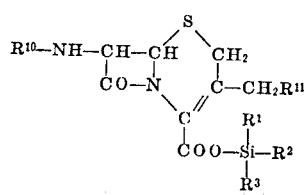

wherein each of $R^1$, $R^2$, and $R^3$ is selected from the group consisting of hydrogen, and a hydrocarbon radical which is free of aliphatic unsaturation and has from one to eight carbon atoms, with not more than two of $R^1$, $R^2$, and $R^3$ bonded to the same silicon atom being hydrogen, and $R^{10}$ is hydrogen or

wherein $R^1$, $R^2$, and $R^3$ are as defined above, and $R^{11}$ is hydrogen, or $CH_3$—X—where X is oxygen or sulfur.

7. A compound as defined in claim 5 wherein each of $R^1$, $R^2$, and $R^3$ is a hydrocarbon radical which is free of aliphatic unsaturation and has from one to eight carbon atoms, and $R^{10}$ is

wherein $R^1$, $R^2$, and $R^3$ is as defined above, and $R^{11}$ is hydrogen.

8. A compound as defined in claim 6, wherein the compound is trimethylsilyl 3-methyl-7-(trimethylsilylamido)-Δ³-cephem-4-carboxylate.

* * * * *